(12) United States Patent
Nassar et al.

(10) Patent No.: US 9,383,283 B2
(45) Date of Patent: Jul. 5, 2016

(54) PRESSURE TRANSDUCER WITH CAPACITIVELY COUPLED SOURCE ELECTRODE

(71) Applicant: Kavlico Corporation, Moorpark, CA (US)

(72) Inventors: Marcos A. Nassar, Los Angeles, CA (US); Ernest W. Cordan, Mesa, AZ (US); Mark L. Urban, Ventura, CA (US)

(73) Assignee: Sensata Technologies, Inc., Attleboro, MA (US)

( * ) Notice: Subject to any disclaimer, the term of this patent is extended or adjusted under 35 U.S.C. 154(b) by 199 days.

(21) Appl. No.: 14/157,235

(22) Filed: Jan. 16, 2014

(65) Prior Publication Data

US 2015/0198495 A1 Jul. 16, 2015

(51) Int. Cl.
| | |
|---|---|
| *G01L 9/12* | (2006.01) |
| *G01L 9/00* | (2006.01) |
| *G01L 1/14* | (2006.01) |
| *H01G 5/16* | (2006.01) |

(52) U.S. Cl.
CPC . *G01L 9/12* (2013.01); *G01L 1/148* (2013.01); *G01L 9/0016* (2013.01); *G01L 9/0072* (2013.01); *H01G 5/16* (2013.01); *Y10T 29/41* (2015.01)

(58) Field of Classification Search
None
See application file for complete search history.

(56) References Cited

U.S. PATENT DOCUMENTS

| | | | | | |
|---|---|---|---|---|---|
| 3,405,559 | A | * | 10/1968 | Moffatt | G01L 9/0005 361/283.4 |
| 4,064,550 | A | * | 12/1977 | Dias | G01L 9/0075 361/278 |

(Continued)

FOREIGN PATENT DOCUMENTS

KR 100962022 B1 6/2010

OTHER PUBLICATIONS

Mar. 30, 2015—(WO) International Search Report—App PCT/US2015/011529.

(Continued)

*Primary Examiner* — Andre Allen
(74) *Attorney, Agent, or Firm* — Banner & Witcoff, Ltd.

(57) ABSTRACT

A capacitive pressure transducer of an embodiment of the present invention capacitively couples two electrodes on a substrate with a diaphragm electrode to form a transducing circuit without the need for a physical connection between the electrodes. Embodiments of the present invention have a substrate with a coupling electrode and a sensing electrode and an attached diaphragm with a diaphragm electrode. A spacer positioned between the substrate and the diaphragm provides for a cavity that defines a gap between the sensing electrode and the diaphragm electrode. A dielectric spacer may be positioned over the coupling electrode to increase the capacitance between the coupling electrode and the diaphragm electrode. The capacitive pressure transducer has similar electrical characteristics as existing capacitive pressure transducers, is easier to manufacture, and has long-term reliability and durability improvements brought about by the elimination of mechanical interconnects and additional conductive materials.

19 Claims, 4 Drawing Sheets

(56) References Cited

U.S. PATENT DOCUMENTS

| | | | | |
|---|---|---|---|---|
| 4,168,518 | A | * | 9/1979 | Lee .................. G01L 1/142 361/283.1 |
| 4,178,621 | A | | 12/1979 | Simonelic et al. |
| 4,204,244 | A | * | 5/1980 | Ho .................. G01L 9/0075 361/275.2 |
| 4,562,742 | A | * | 1/1986 | Bell .................. G01L 19/0636 361/283.4 |
| 5,911,162 | A | * | 6/1999 | Denner .............. G01L 19/0618 361/283.4 |
| 6,223,603 | B1 | | 5/2001 | McKinnon |
| 7,383,737 | B1 | * | 6/2008 | Lin .................. G01L 9/0072 73/718 |
| 2002/0190727 | A1 | * | 12/2002 | Morimoto ............. G01L 5/165 324/661 |
| 2003/0222660 | A1 | * | 12/2003 | Morimoto ............. G01L 1/142 324/661 |
| 2005/0229710 | A1 | * | 10/2005 | O'Dowd ............. G01L 9/0072 73/718 |
| 2008/0087069 | A1 | * | 4/2008 | Renken .............. G01L 9/0073 73/1.63 |
| 2009/0160462 | A1 | * | 6/2009 | Harish .............. B60C 23/0408 324/686 |
| 2012/0180575 | A1 | * | 7/2012 | Sakano .............. G01L 1/142 73/862.626 |
| 2015/0198495 | A1 | * | 7/2015 | Nassar .............. G01L 9/12 73/724 |
| 2015/0204747 | A1 | * | 7/2015 | Cornwell .......... F02M 25/0754 73/114.37 |

OTHER PUBLICATIONS

May 18, 2015 (EP) Extended Search Report—App 15151377.7.

* cited by examiner

PRESSURE TRANSDUCER WITH CAPACITIVELY COUPLED SOURCE ELECTRODE

BACKGROUND OF THE INVENTION

A capacitive pressure transducer converts changes in pressure applied to its diaphragm into corresponding capacitance changes to enable pressure measurements to be made. Behind the diaphragm is a pressure cavity with parallel offset conductive plates that compose a variable capacitor to detect strain due to applied pressure on the diaphragm, where one of the parallel offset conductive plates is in a fixed position relative to the diaphragm and the other is affixed to the diaphragm.

Typical pressure sensors include two major parts: (i) an element affected by pressure changes, such as a capacitive pressure transducer, and (ii) electronics, sometimes referred to as a signal conditioner, for providing a modulated electrical signal to the capacitive pressure transducer and for detecting effects on the modulated signal imparted by the capacitive pressure transducer as a function of the pressure changes.

Typical capacitive pressure transducers use metal, ceramic, or silicon diaphragms to which one parallel offset conductive plate is attached. The other plate is attached to a substrate that is insensitive to pressure changes. Pressure changes induce flexion in the diaphragm, which change the distance between the parallel offset conductive plates, causing a measurable change in capacitance. This change may or may not be linear and is typically no more than a few picofarads out of a total capacitance of 50-100 pF. This change in capacitance may be used to control the frequency of an oscillator or to vary the coupling of an AC signal. The electronics for signal conditioning are commonly located close to the transducing elements, preventing errors due to stray capacitance.

SUMMARY OF THE INVENTION

An example embodiment of the present invention is a capacitive pressure transducer comprising a substrate having thereon a sensing electrode and a coupling (source) electrode, a diaphragm having a diaphragm electrode thereon, and a spacer positioned between the substrate and the diaphragm. The spacer provides a cavity between the sensing electrode and the diaphragm electrode and forms a fixed capacitive gap between the coupling electrode and the diaphragm electrode and a dynamic capacitive gap between the sensing electrode and the diaphragm electrode. The coupling electrode and the diaphragm electrode together define a coupling capacitance, and the sensing electrode and the diaphragm electrode together define a sensing capacitance, wherein pressure change on the diaphragm causes a corresponding change in the sensing capacitance. The coupling electrode, diaphragm electrode, and sensing electrode together form a circuit that can be modeled as two capacitors in series. The electrodes may be conductive plate electrodes positioned to form parallel plate capacitors.

The sensing electrode and the coupling electrode may be arranged in a concentric pattern, and the coupling electrode may be arranged outside of the sensing electrode, whereby the coupling electrode at least partially surrounds the sensing electrode.

In one embodiment of the present invention, the spacer is positioned over the coupling electrode. The spacer may be a dielectric material, such as glass, placed over the coupling electrode to increase the capacitance between the coupling electrode and the diaphragm electrode. In an alternative embodiment, a dielectric material may be placed over the coupling electrode, and the spacer is not positioned over the coupling electrode.

In another embodiment, the coupling, diaphragm, and sensing electrodes respectively form a series capacitor circuit with two capacitors, the series capacitor circuit having an equivalent capacitance about equal to the sensing capacitance. The coupling capacitance may be least three times greater than the sensing capacitance, or the coupling capacitance may alternatively be at least five times greater than the sensing capacitance to reduce an amount of sensing signal amplitude loss due to the capacitive coupling.

In an example embodiment, the diaphragm electrode is not in physical electrical contact with an electrode lead on the substrate.

In yet another embodiment, the capacitive pressure transducer is driven by a modulated signal source in electrical communication with the coupling electrode, with the modulated signal source capacitively energizing the diaphragm electrode by way of the coupling electrode. The modulated signal source may output an AC signal between 100 kHz and 1 MHz, or other frequency range suitable for driving the particular electrode configuration.

In another embodiment, the capacitive pressure transducer is in electrical communication with a signal conditioner to receive an electrical sensing signal from the sensing electrode. The signal may include the modulated signal source. The signal conditioner may increase gain applied to the electrical sensing signal to compensate for a loss in sensitivity due to capacitive energizing of the diaphragm electrode compared to physical contact energizing of the diaphragm electrode.

Another example embodiment of the present invention is a method of transducing pressure including capacitive coupling a coupling electrode with a diaphragm electrode and a sensing electrode with the diaphragm electrode, deflecting a diaphragm having the diaphragm electrode in response to pressure changes associated with a fluid in pressure communication with the diaphragm, and modulating a sensing capacitance as a function of diaphragm deflection. The coupling electrode and diaphragm electrode form a coupling capacitor with a coupling capacitance and the sensing electrode and the diaphragm electrode form a sensing capacitor with a sensing capacitive. Another embodiment includes energizing the sensing electrode through a series capacitor circuit, the series capacitor circuit containing the coupling capacitor and the sensing capacitor, the series capacitor circuit having an equivalent capacitance about equal to the sensing capacitance.

In another embodiment, deflecting the diaphragm in response to pressure changes associated with the fluid includes maintaining a spacing of the diaphragm away from the substrate with a spacer defining a gap distance between an internal surface of said diaphragm and the substrate and changing the gap distance in response to pressure changes associated with the fluid.

In yet another embodiment, maintaining a spacing of the diaphragm away from the substrate with a spacer further includes increasing the coupling capacitance with a spacer made from a dielectric material.

The pressure transducer with capacitively coupled coupling (source) electrode is easier to manufacture due to the elimination of all rotational alignment requirements during assembly and is more durable than transducers that employ a physical connection to the diaphragm electrode as neither solder nor conductive epoxies, nor other attachment materials, are used for assembly, eliminating the associated failure modes of those materials.

Another example embodiment of the present invention is a method of manufacturing a capacitive pressure transducer including affixing a coupling electrode and a sensing electrode to a surface of substrate, affixing a diaphragm electrode to an inner surface of a diaphragm, affixing a spacer to the substrate and the inner surface of the diaphragm, the spacer maintaining a spacing of the diaphragm away from the substrate and defining a gap distance between an internal surface of said diaphragm and the substrate, and forming a series capacitor circuit with a sensing capacitor and a coupling capacitor. The sensing capacitor includes the sensing electrode and the diagram electrode and the coupling capacitor includes the coupling capacitor and the diaphragm electrode.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
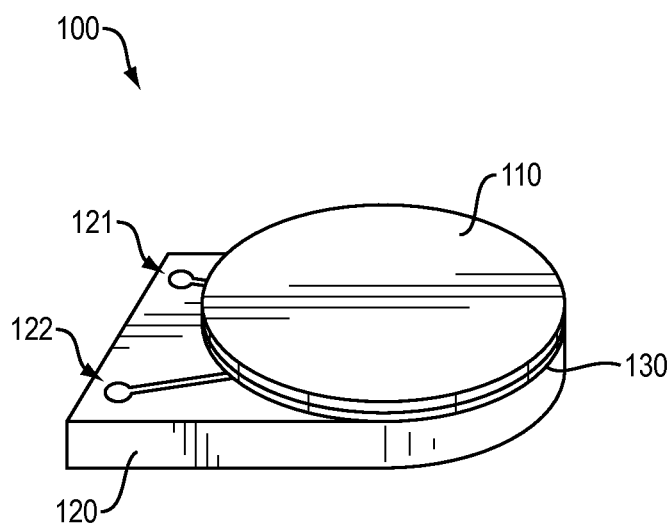
FIGS. 1A and 1B are perspective and profile views, respectively, of a capacitive pressure transducer according to an embodiment of the present invention.
Figure 1B:
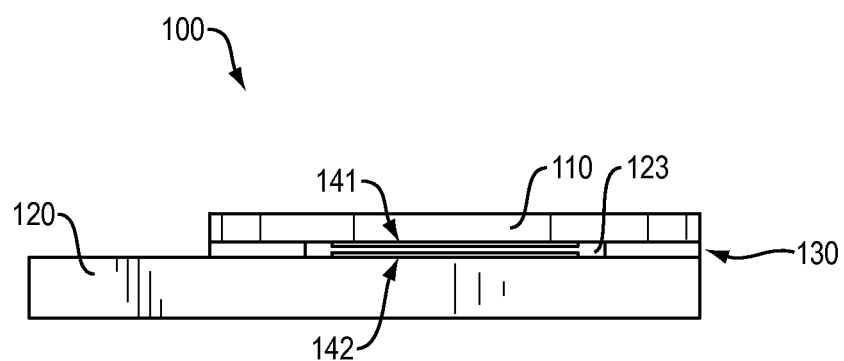

FIGS. 1A and 1B are perspective and profile views, respectively, of an embodiment of a capacitive pressure transducer according to an embodiment of the present invention. The capacitive pressure transducer 100 includes a rigid substrate 120 and a flexible diaphragm 110 separated by a small internal gap 123. The gap is formed by a spacer 130 used to join the diaphragm 110 to the substrate 120. Electrode leads 121, 122 provide an electrical connection to a conductive plate electrode 141 on the diaphragm 110 and a conductive plate electrode 142 on the substrate 120. The conductive plate electrodes 141, 142 form a parallel plate capacitor, as shown in FIG. 1B. When the diaphragm 110 is exposed to a fluid, deflection of the flexible diaphragm 110 occurs due to pressure changes in the fluid. The gap 123 distance between the conductive plate electrodes 141, 142 changes in response to deflection of the diaphragm 110 and a capacitance of the parallel plate capacitor changes as a function of the gap 123 distance.

Figure 2A:
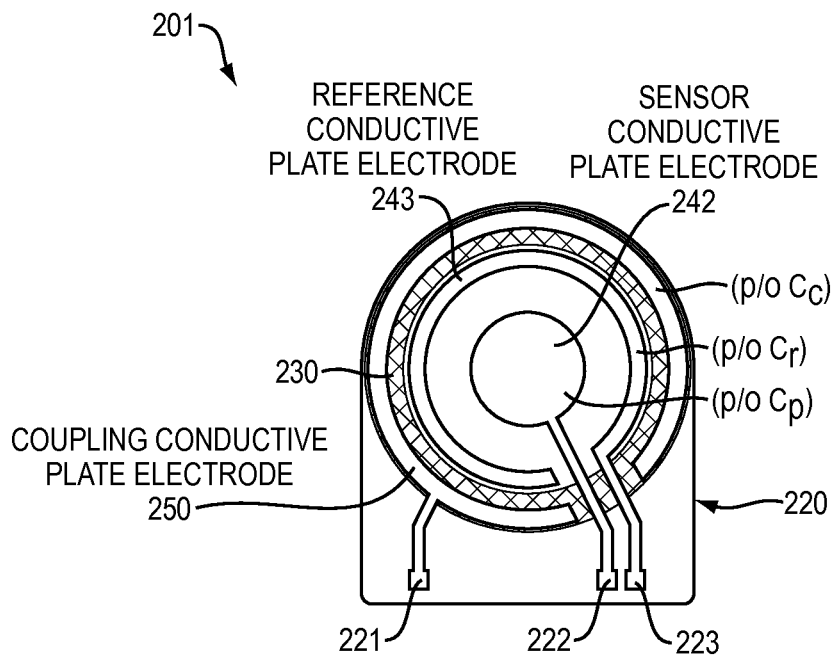
FIGS. 2A and 2B are schematic diagrams of conductive plate electrodes of a pressure transducer having elements of an embodiment of the present invention.
Figure 2B:
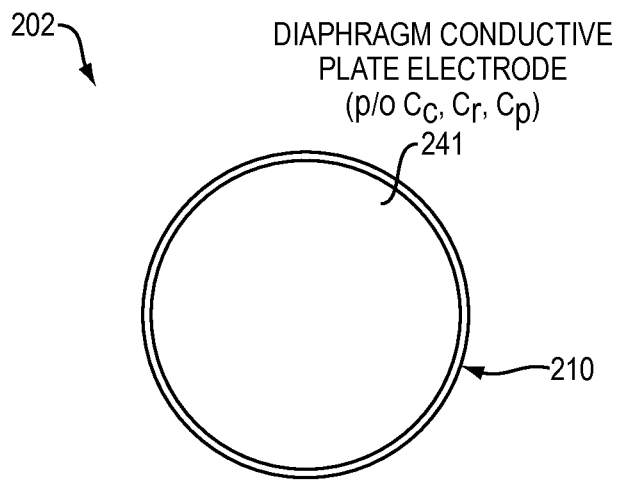

FIGS. 2A and 2B are diagrams of an embodiment of the present invention. The embodiment enables a capacitive pressure transducer and methods corresponding to same to eliminate a physical electrical connection between an electrode lead on the substrate and a conductive plate electrode on the diaphragm, making assembly easier through reduced alignment requirements and improving long term durability and reliability.

Referring to FIGS. 2A and 2B, a substrate assembly 201 with a spacer 230 is shown. The spacer 230 is configured to bond a diaphragm assembly 202 to the substrate assembly 201 to form a capacitive pressure transducer and provide a gap between the rigid substrate 220 and the flexible diaphragm 210. The spacer 230 is normally a non-conductive material, such as glass, that is fused at high temperature to produce an air-tight joint between the substrate 220 and the diaphragm 210.

The substrate assembly 201 has a substrate 220 that includes three electrode leads 221, 222, 223.

A coupling (source) electrode lead 221 is connected to a coupling (source) conductive plate electrode 250 to form a coupling (source) capacitor ($C_c$) with the diaphragm conductive plate electrode 241 of the diaphragm assembly 202 of FIG. 2B.

A sensing electrode lead 222 connects to a sensing conductive plate electrode 242 placed in the center of the substrate 220 and forms a variable pressure sensing capacitor ($C_p$) with the diaphragm conductive plate electrode 241 of the same diaphragm assembly 202 of FIG. 2B.

A reference electrode lead 223 connects to a peripheral reference conductive plate electrode 243 located close to the outer diameter of the substrate 220 to form a non-varying reference capacitor ($C_r$) with the diaphragm conductive plate electrode of 241 of FIG. 2B.

The capacitance values of pressure sensing capacitors ($C_x$) are typically measured in the range of picofarads ($10^{-12}$ F) and are given by the following equation:

$$C_{Total} = \frac{C_p * C_c}{C_p + C_c} \approx C_p \text{ if } C_c \gg C_p$$

where $\in$ is the dielectric constant of the media in the gap (usually air), "A" is the area of the overlapping electrodes, and "d" is the distance or gap between electrodes.

Capacitive pressure sensors work by energizing pressure sensing transducer electrodes with a time-varying or alternating voltage or current applied to the electrodes. Capacitors act as low impedance conductors for time-varying electrical signals. Another capacitor ($C_c$) can be connected in series with the pressure sensing capacitor ($C_p$) and the reference capacitor ($C_r$) without significantly changing the total capacitance value that the combined circuit will electrically see, from an impedance viewpoint, if the added capacitor ($C_c$) has a significantly higher value as compared to the sensor capacitors ($C_p$).

An embodiment of the present invention utilizes the principles that a coupling capacitor (Cc) can be connected in series with the $C_p$ and $C_r$ capacitors to replace the physical connection without significantly changing the total capacitance value that the combined circuit has, provided that the added capacitor has a significantly higher value when compared to the sensor capacitor ($C_p$). This is represented in the following circuit equation:

$$\dashv\vdash\dashv\vdash \approx \dashv\vdash \text{ if } C_c \gg C_p$$
$$\quad C_c \quad C_p \qquad\quad C_p$$

The capacitance of two capacitors connected in series as shown above is given by:

$$C = \frac{\varepsilon * A}{d},$$

The same equation applies to $C_r$.

Continuing to refer to FIGS. 2A and 2B, the diaphragm conductive plate electrode 241 uses the above principle to energize the sensing capacitor ($C_p$) and, optionally, the reference capacitor ($C_r$), without the need of a physical connection to the diaphragm conductive plate electrode 241 on the diaphragm 210. The energizing of the sensing capacitor ($C_p$) is performed by adding the coupling capacitor ($C_c$) in series with the $C_p$ and $C_r$ capacitors. The coupling conductive plate electrode 250 is added to the substrate 220, and, by extending the diameter of the diaphragm conductive plate electrode 241 on the diaphragm 210 to overlap the coupling conductive plate electrode 250 on the substrate 220, a third coupling capacitor $C_c$ is implemented. This approach eliminates the need for rotational alignment of the diaphragm 210 to the substrate 220 because the approach eliminates the need for a contact pad on the diaphragm 210.

In addition, the coupling conductive plate electrode 250 may be printed in the area under a glass spacer 230. The dielectric constant of a typical glass spacer 230 at 4 to 10 is significantly higher than that of air at 1.0006, and the presence of the glass spacer creates a coupling capacitor $C_c$ that is of significantly higher value than the same capacitor without the additional dielectric material (e.g., glass) present between electrodes. This is true for both the sensor capacitor $C_p$ and the reference capacitor $C_r$. When using a glass spacer in the coupling capacitor $C_c$, the overall capacitance seen by an electronic device observing the coupling capacitor $C_c$ and the sensing capacitor $C_p$ or reference capacitor $C_r$ in series connection is an overall circuit capacitance close to the original $C_p$ or $C_r$ capacitance, depending on which circuit is being considered.

Figure 3A:
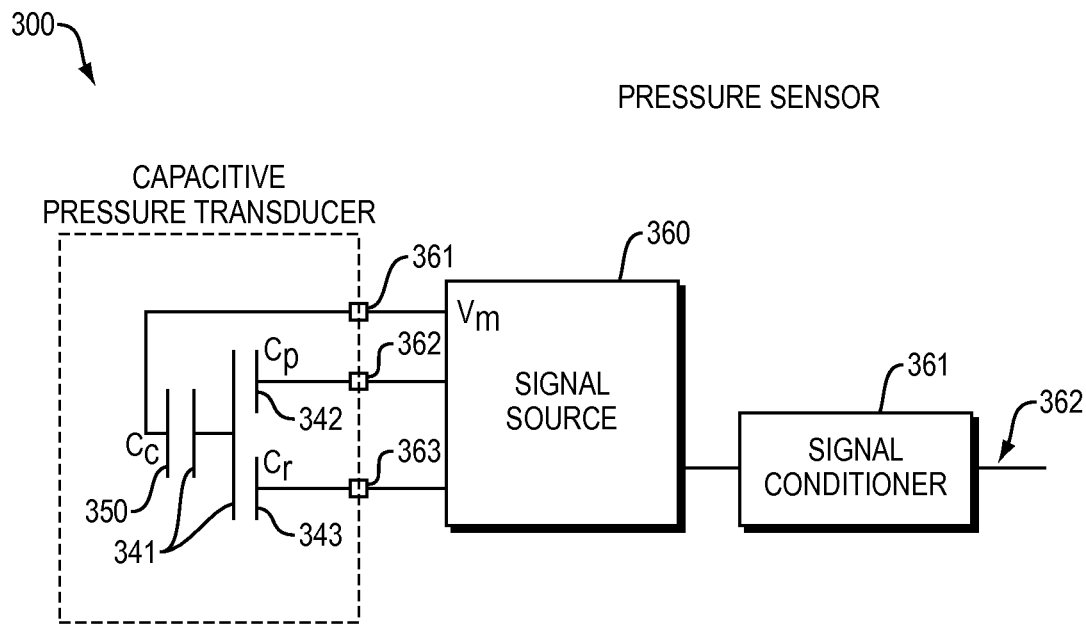
FIGS. 3A and 3B are circuit diagrams of an example pressure sensor in accordance with embodiments of the present invention.
Figure 3B:
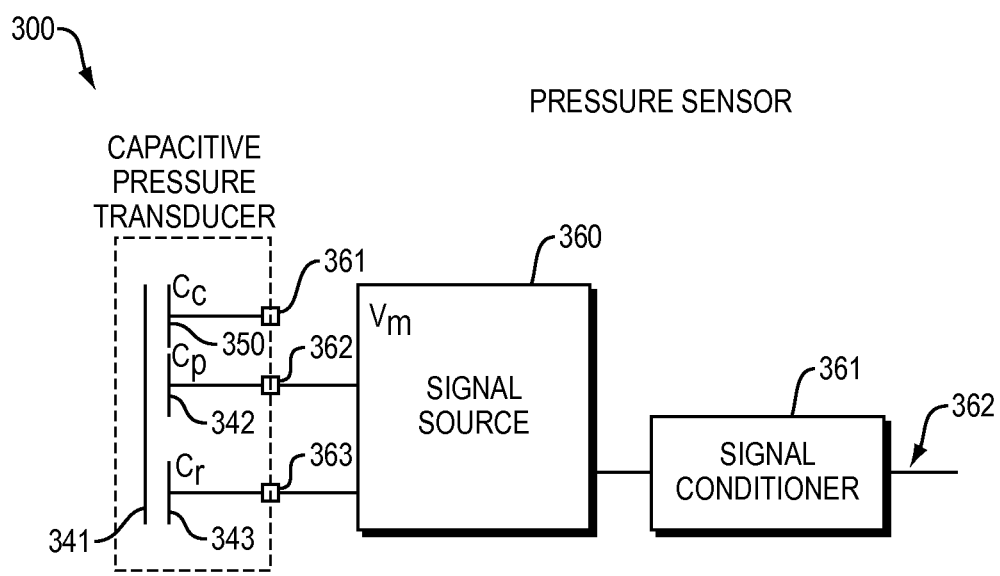

FIGS. 3A and 3B are circuit diagrams of the capacitive pressure sensor of FIGS. 3A and 3B in accordance with embodiments of the present invention. FIG. 3A is a schematic diagram of the capacitive pressure transducer 201, 202 of FIGS. 2A and 2B, and FIG. 3B is the diagram of FIG. 3A rearranged to show how the diaphragm conductive plate 341 electrode is physically disconnected from the electrode leads 361, 362, and 363 on the substrate.

In FIG. 3A, a signal source 360 provides a time-varying or alternating voltage (or current) ($V_m$) applied to the electrode leads 361, 362, and 363.

The signal ($V_m$) may be between 100 kHz and 1 MHz, or other frequency that applies to the particular capacitance configuration being employed. The signal is provided through a capacitive connection 350 with the diaphragm conductive plate electrode 341. The change in capacitance between diaphragm conductive plate electrode 341 and sensor conductive plate electrode 342 (i.e., the $C_p$ capacitor) can be measured because capacitors act as low impedance conductors for time-varying electrical signals.

Continuing to refer to FIGS. 3A and 3B, a reference capacitor is formed between the diaphragm conductive plate electrode 341 and a reference conductive plate electrode 343 (the $C_r$ capacitor) and can be included and configured or used to correct for electromagnetic interference or temperature effects affecting both $C_c$ and $C_p$ capacitors, as known in the art. Any signal gain lost due to the capacitive connection 350 may be corrected by a signal conditioner 361, which provides an output signal 362 with a gain increased as a function of the capacitance of the $C_c$ and $C_p$ capacitors. Noise increase as a function of gain increase is not significant, and benefits of the reduced manufacturing and increased reliability of the pressure transducer with capacitively coupled source electrode favor any minor increase in noise of sensing signal.

Figure 4:
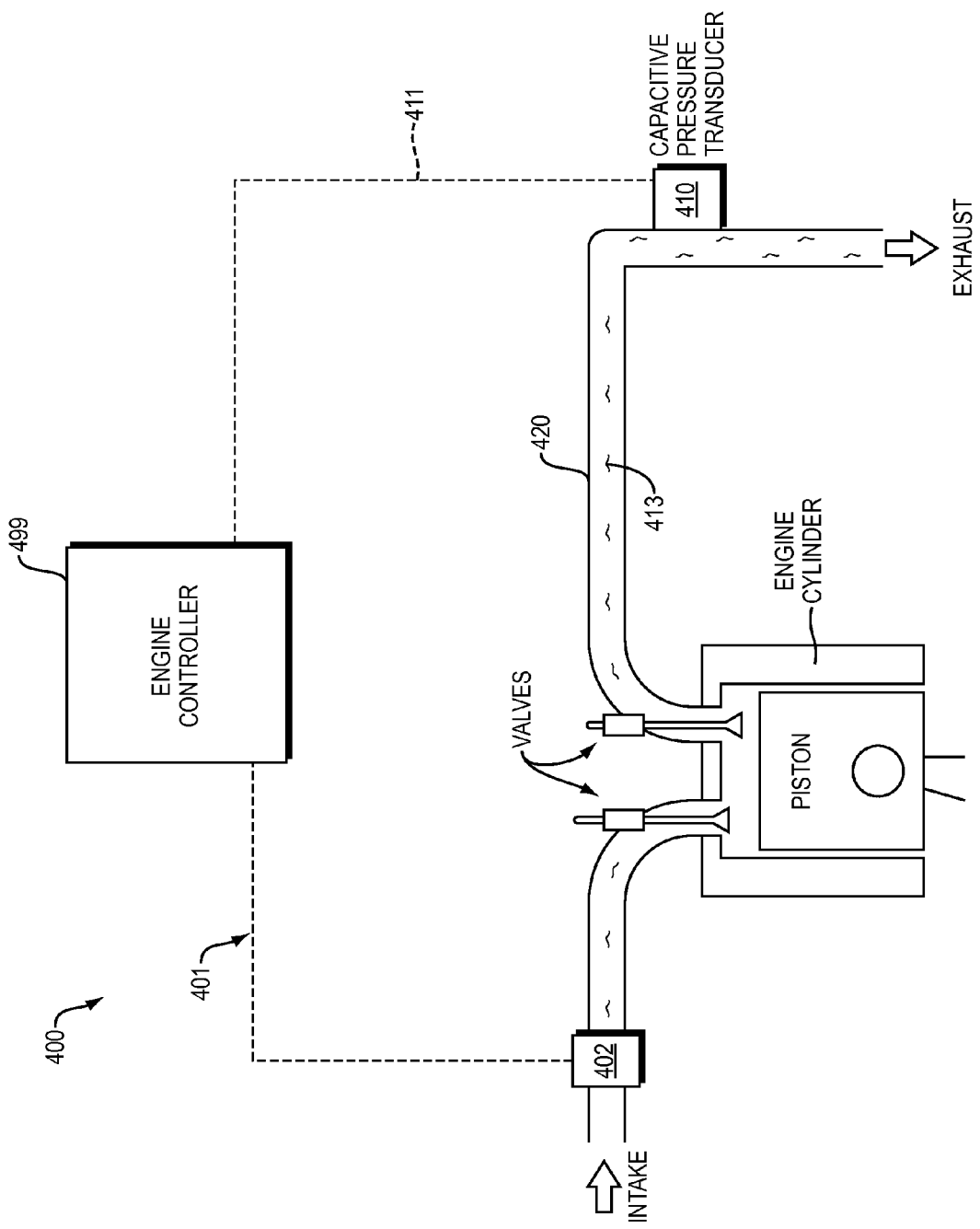
FIG. 4 is a schematic diagram of a diesel engine with embodiments of the present invention.

FIG. 4 is a diagram of a diesel internal combustion engine 400 having the pressure transducer of FIGS. 2A and 2B in accordance with embodiments of the present invention. Features of the present invention apply to any capacitive pressure sensor that incorporates a diaphragm and a substrate, and that uses one or more electrodes on the substrate and diaphragm. Capacitive pressure sensors such as these are used in automotive, aerospace, industrial, medical, and other applications. A typical application for capacitive pressure sensors is in the diesel engine 400, where a pressure signal 411 from a capacitive pressure sensor 410 having embodiments of the present invention is used to measure pressure of a working fluid 413 of the engine.

In FIG. 4, the capacitive pressure sensor 410 is in fluid communication with an exhaust manifold 420. The capacitive pressure sensor 410 provides the pressure signal 411 (typically between 0.5 volts and 4.5 volts) to an engine controller 499. The engine controller 499 uses the pressure signal 411 as feedback for controlling electrical communication 401 with a throttle subsystem 402.

The use of a ceramic diaphragm in the capacitive pressure sensor 410 allows the capacitive transducer of the capacitive pressure sensor 410 to be in direct pressure communication with the fluid 413 in the exhaust manifold 420 without the need for a pressure-transmitting fluid, e.g., oil, in the capacitive pressure sensor 410 to protect the diaphragm.

While this invention has been particularly shown and described with references to example embodiments thereof, it will be understood by those skilled in the art that various changes in form and details may be made therein without departing from the scope of the invention encompassed by the appended claims.

What is claimed is:

1. A capacitive pressure transducer, comprising:
   a substrate having thereon a coupling electrode and a sensing electrode;
   a diaphragm having a diaphragm electrode thereon; and
   a spacer positioned between the substrate and the diaphragm, the spacer providing a cavity that includes a gap between the coupling electrode and the diaphragm electrode and between the sensing electrode and the diaphragm electrode, the coupling electrode and the diaphragm electrode defining a coupling capacitance and the sensing electrode and the diaphragm electrode defining a sensing capacitance, wherein the diaphragm electrode is not in physical, electrically conductive, contact with the coupling electrode on the substrate wherein a pressure change on the diaphragm causes a corresponding change in the sensing capacitance.

2. The capacitive pressure transducer of claim 1, wherein the coupling electrode and the sensing electrode are concentric.

3. The capacitive pressure transducer of claim 2, wherein the coupling electrode is arranged outside of the sensing electrode.

4. The capacitive pressure transducer of claim 1, wherein the spacer is further positioned over the coupling electrode.

5. The capacitive pressure transducer of claim 4, wherein the spacer is made of a dielectrically stable material.

6. The capacitive pressure transducer of claim 1, further including a dielectric material placed over the coupling electrode.

7. The capacitive pressure transducer of claim 1, wherein the coupling, diaphragm, and sensing electrodes respectively form a series capacitor circuit, the series capacitor circuit having an equivalent capacitance about equal to the sensing capacitance.

8. The capacitive pressure transducer of claim 1, wherein the coupling capacitance is at least three times greater than the sensing capacitance.

9. The capacitive pressure transducer of claim 1, wherein the coupling capacitance is at least five times greater than the sensing capacitance.

10. The capacitive pressure transducer of claim 1, wherein the diaphragm electrode is not in physical electrical contact with the sensing electrode and the coupling electrode.

11. The capacitive pressure transducer of claim 1, wherein a modulated signal source (AC) in electrical communication with the coupling electrode, the modulated signal source capacitively energizing the diaphragm electrode.

12. The capacitive pressure transducer of claim 11, wherein the modulated signal source outputs an AC signal between 100 kHz and 1 Mhz.

13. The capacitive pressure transducer of claim 1, wherein a signal conditioner in electrical communication with the sensing electrode.

14. The capacitive pressure transducer of claim 13, wherein the signal conditioner increases gain applied to a sensing signal received from the sensing electrode to compensate for a loss in sensitivity due to capacitive energizing of the diaphragm electrode compared to physical contact energizing of the diaphragm electrode.

15. A method of transducing pressure, the method comprising:
   capacitively coupling a coupling electrode and a diaphragm electrode, the coupling electrode and diaphragm electrode defining a coupling capacitor having a coupling capacitance;
   capacitively coupling a sensing electrode and the diaphragm electrode, the sensing electrode and diaphragm electrode defining a sensing capacitor having a sensing capacitive, wherein the diaphragm electrode is not in physical, electrically conductive, contact with the sensing electrode and the coupling electrode on a substrate
   deflecting a diaphragm having the diaphragm electrode in response to pressure changes associated with a fluid in pressure communication with the diaphragm; and
   modulating the sensing capacitance as a function of diaphragm deflection.

16. The method of claim 15, wherein deflecting the diaphragm in response to pressure changes associated with the fluid includes:
   maintaining a spacing of the diaphragm away from the substrate with a spacer defining a gap distance between an internal surface of the diaphragm and the substrate; and
   changing the gap distance in response to pressure changes associated with the fluid.

17. The method of claim 16, wherein maintaining a spacing of the diaphragm away from the substrate with a spacer further includes:
   increasing the coupling capacitance with a spacer made from a dielectric material.

18. The method of claim 15, further comprising:
   energizing the sensing electrode through a series capacitor circuit, the series capacitor circuit containing the coupling capacitor and the sensing capacitor, the series capacitor circuit having an equivalent capacitance about equal to the sensing capacitance.

19. A method of manufacturing a capacitive pressure transducer, the method comprising:
   affixing a coupling electrode and a sensing electrode to a surface of a substrate;
   affixing a diaphragm electrode to an inner surface of a diaphragm, wherein the diaphragm electrode is not in physical, electrically conductive, contact with the coupling electrode on the substrate;
   affixing a spacer to the substrate and the inner surface of the diaphragm, the spacer maintaining a spacing of the diaphragm away from the substrate and defining a gap distance between an internal surface of the diaphragm and the substrate;
   forming a sensing capacitor with the sensing electrode and the diaphragm electrode;
   forming a coupling capacitor with the coupling electrode and the diaphragm electrode; and
   forming a series capacitor circuit with the sensing capacitor and coupling capacitor.

\* \* \* \* \*